United States Patent [19]

Kobayashi et al.

[11] Patent Number: 5,541,928
[45] Date of Patent: Jul. 30, 1996

[54] COMMUNICATION SYSTEM WHICH ESTABLISHES COMMUNICATION SESSIONS BASED ON UNIT ID CODES TO AVOID TRANSMISSION CONFLICTS

[75] Inventors: Nakaba Kobayashi; Michinaga Nagura, both of Kariya; Kazumasa Toyama, Nagoya, all of Japan

[73] Assignee: Nippondenso Co., Ltd., Kariya, Japan

[21] Appl. No.: 334,329

[22] Filed: Nov. 2, 1994

[30] Foreign Application Priority Data

Nov. 2, 1993 [JP] Japan .................................. 5-274361

[51] Int. Cl.⁶ .................................................. H04J 3/16
[52] U.S. Cl. ...................................... 370/95.1; 455/54.2
[58] Field of Search ................... 370/95.1, 98; 455/33.1, 455/54.1, 54.2

[56] References Cited

U.S. PATENT DOCUMENTS

| 4,471,345 | 9/1984 | Barrett, Jr. | 340/572 |
| 5,068,654 | 11/1991 | Husher | 455/56.1 |
| 5,345,474 | 9/1994 | Hoshikawa | 370/95.1 |

FOREIGN PATENT DOCUMENTS

| 427342 | 5/1991 | European Pat. Off. . |
| 495708 | 7/1992 | Germany . |
| 2259387 | 3/1993 | United Kingdom . |

*Primary Examiner*—Benedict V. Safourek
*Assistant Examiner*—Min Jung
*Attorney, Agent, or Firm*—Cushman, Darby & Cushman

[57] ABSTRACT

A communication system between a host station and a plurality of substations eliminates the possibility of a connection failure between the host and a given substation by attempting to establish a communication session a finite number of times. The host station transmits and receives data to and from the substations and processes the data. Every time one of the substations receives a pilot command from the host station, it selects a time slot provided in the host station's operation schedule based on digit information of the substation's unique ID code and transmits a response signal in that time slot to the host. If the response conflicts with another substation's response, information based on a different digit in the ID code is selected. Because the ID code is unique to the substation, a communication session will eventually be established, and the probability of a conflict with a response from another substation is reduced to zero by re-transmission by transmitting the request a finite number of times.

17 Claims, 5 Drawing Sheets

COMMUNICATION SYSTEM WHICH ESTABLISHES COMMUNICATION SESSIONS BASED ON UNIT ID CODES TO AVOID TRANSMISSION CONFLICTS

CROSS REFERENCE TO RELATED APPLICATION

This application claims the benefit of priority of the prior Japanese patent application No. 5-274361 filed on Nov. 2, 1993, the contents of which are incorporated herein by reference.

BACKGROUND OF THE INVENTION

1. Field of the Invention

The present invention relates to a communication system between a host station and a substation which preferably includes a non-contact tag device. More particularly, the present invention relates to a communication system for implementing processing such as data communication by identifying a plurality of moving substations.

2. Description of the Related Art

Conventionally, communication between a host station and a substation utilizing a weak radio wave has been made by controlling them in a 1-to-1 relationship and by polling the substation from the host station. However, when a plurality of substations exist, there has been a problem that responses to the polling from the host station made from the substations conflict and thereby no communication can be made.

Then, as a method for solving such a problem, a communication method disclosed in Japanese Patent Publication No. Hei. 3-2271, for example has been proposed. According to this method, when a monitor station, i.e., a host station, issues an inquiry signal containing a monitor station ID code and when a tag circuit, i.e., a substation, generates a response signal containing a tag circuit ID code in response to the inquiry signal, the response signal generated by the tag circuit is input at random to one time slot among a plurality of time slots provided in the monitor station.

However, the prior art method described above has a problem in that although it provides a possibility that a plurality of tags may be simultaneously processed, a probability of a communication failure is not negligible. That is, because a plurality of response signals of the tags are input while each tag selecting its time slot at random, there is a possibility that the same time slot is selected for the substations, thus causing a conflict among the response signals. The probability of the conflict is (1/number of time slots). Although this conflicting probability may be reduced of course by re-transmitting the response signal, the probability cannot be reduced to zero by a finite number of times of re-transmission.

As a countermeasure, a method of increasing a number of time slots or of increasing a number of times of re-transmission is conceivable and may in fact allow reduction of the probability of a communication failure due to the conflicts to a negligible degree. However, when the tag is attached to an object moving at high speed for example, a sufficient number of time slots or sufficient number of times of re-transmission may not be assured because a communication window time between the host station and the substation is limited.

SUMMARY OF THE INVENTION

Accordingly, it is an object of the present invention to solve the aforementioned problem by providing a communication system between a monitor station and a plurality of tags wherein response signals of the plurality of tags will not conflict and a probability of a communication failure due to the conflict is reduced to zero by a finite number of times of re-transmission.

In order to achieve the aforementioned object, in the inventive communication system between a host station and one or more substations respectively having an individual ID code which enter a monitoring range of the host station, the host station comprises an inquiry signal transmitting means for transmitting an inquiry signal to the substations entering the monitoring range with a predetermined period: and the substation comprises an inquiry signal discriminating means for discriminating whether a signal transmitted from the host station is the inquiry signal or not;

an selection means for counting a number of times of discrimination of the inquiry signal made by the inquiry signal discriminating means to select certain digit information from code information in the ID code individual to the substation corresponding to the counted number of times of discrimination; and a response signal transmitting means for transmitting a response signal containing the ID code after waiting for a time corresponding to the digit information selected by the selection means.

Preferably, the host station further comprises an information request signal transmitting means for transmitting an information request signal for requesting information of the received substation including the ID code thereof when the host station receives the response signal from the substation within a predetermined time: and the substation comprises;

an ID code discriminating means for discriminating, when the substation receives the information request signal from the host station, whether the ID code contained in the information request signal coincides with the ID code of the substation; and an information signal transmitting means for transmitting a certain information signal which corresponds to the information request signal to the host station when the ID code is determined to be that of the substation by the ID code discriminating means.

In the system constructed as described above, the host station transmits an inquiry signal to the substations entering the monitor range through the inquiry signal transmitting means with the predetermined period. Then, the substation discriminates whether the signal from the host station is the inquiry signal or not by the inquiry signal discriminating means. When the host signal is discriminated to be the inquiry signal, certain digit information is selected from the code information of the ID code corresponding to a number of times of discrimination by the selection means. Then, the response signal transmitting means transmits the response signal containing the ID code after waiting for a time corresponding to the selected digit information. Here, the ID code is represented by "m" digits in a base "n" number (nadic) system, the notation of which is, for example, $ID = i_m i_{m-1} \ldots i_j \ldots i_2 i_1$ (where, $0 \leq i_j < n$, $1 \leq j \leq m$). The selection means in each substation selects j-th digit information $i_j$, for example from the code corresponding to the discrimination of the inquiry signal. Then, the response signal transmitting means transmits the response signal after waiting for a time corresponding to the selected j-th digit information $i_j$. That is, even when a plurality of substations enter the monitoring range, a conflict of their response signals can be avoided if the j-th digit information of each differs. Incidentally, if a plurality of substations whose j-th digit information $i_j$ is equal enter the monitoring range, signals transmitted from the response signal transmitting means conflict with each other and cannot be processed by the host station. Then, not receiving the response signals from the substations, the host station re-transmits the inquiry signal in the next period. The substation counts a number of times of discrimination for discriminating the inquiry signal by the selection means every time the inquiry signal discriminating means discriminates the inquiry signal and updates (shifts) a digit to be selected from the code information of the ID code corresponding to the counted number of times of discrimination to select certain digit information in the present digit. For example, when a next inquiry signal is transmitted from the inquiry signal transmitting means, the substation selects digit information corresponding to (j+1)-th digit information $i_{j+1}$ to re-transmit the response signal. Then, the substation repeats this operation sequentially as long as the inquiry signal is transmitted. This number of times does not exceed the finite number "m" because the ID code is individual to the substation and there are no two substations whose information of "m" digits are identical. In other words, the conflict of the response signals can be avoided by at most m-times transmission.

Assume further that the host station has received the response signal from the substation within a certain period of time. At this time, although there is no problem if all the information which the host station requires can be contained in the response signal, it is possible that the host station requires too much information to be contained therein. Then, the host station transmits the signal for requesting information from the received substation, while including the ID code of the substation, by the information request signal transmitting means. Then, receiving the information request signal from the host station, the substation discriminates whether the ID code contained in the received information request signal coincides with that of the substation by the ID code discriminating means and when they coincide, the substation transmits certain information which corresponds to the information request signal to the host station. Accordingly, the substation can transmit the information which cannot be contained only in the above-mentioned response signal correctly to the host station based on the information request signal from the host station.

The above and other related objects and features of the present invention will be appreciated from a study of the following detailed description, the appended claims, and drawings, all of which form a part of this application.

DETAILED DESCRIPTION OF PREFERRED EMBODIMENT

Figure 1:
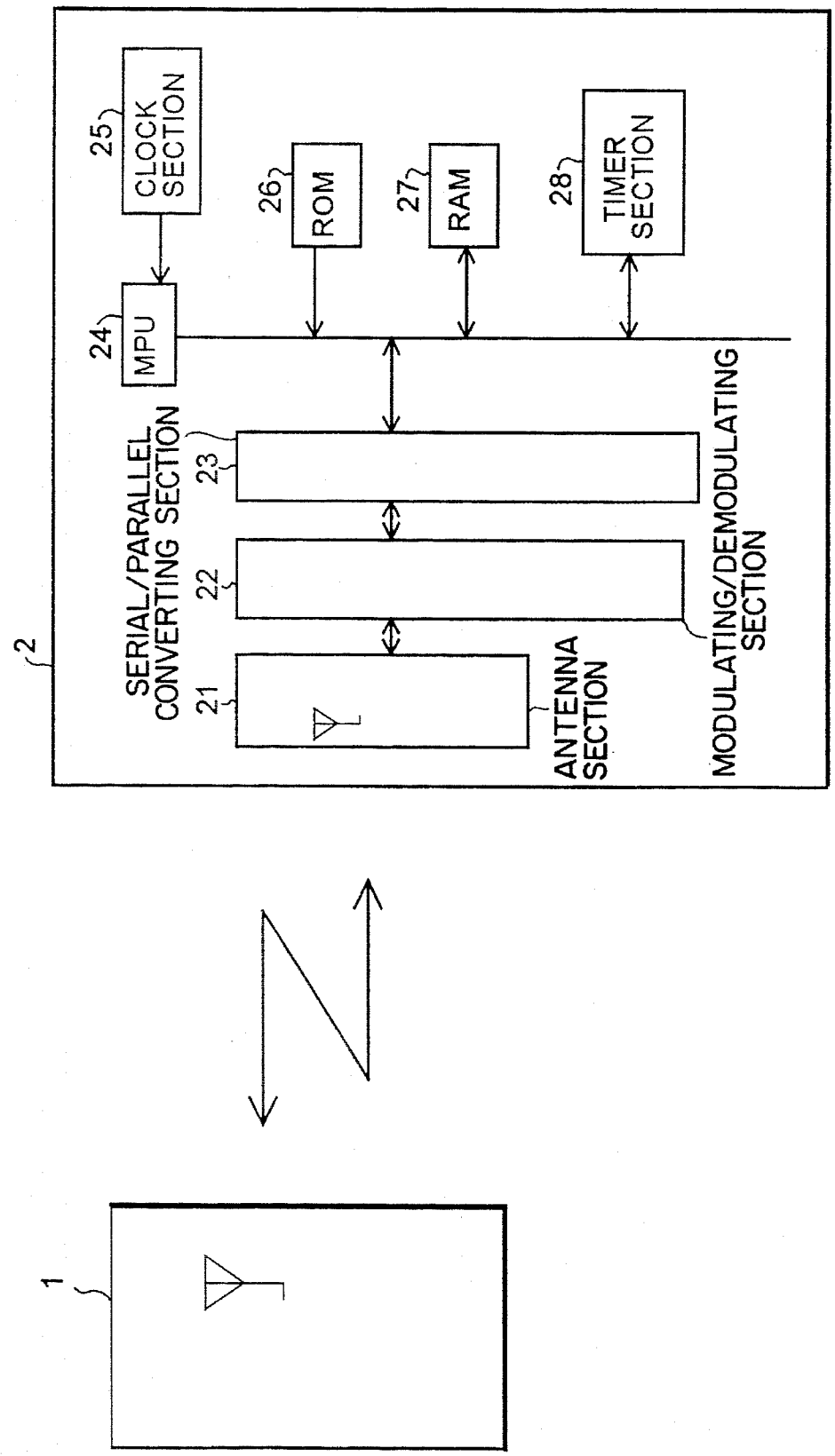
FIG. 1 is a block diagram showing one embodiment of the present invention.

Now the present invention will be explained based on preferred embodiments thereof shown in the drawings.

Figure 2:
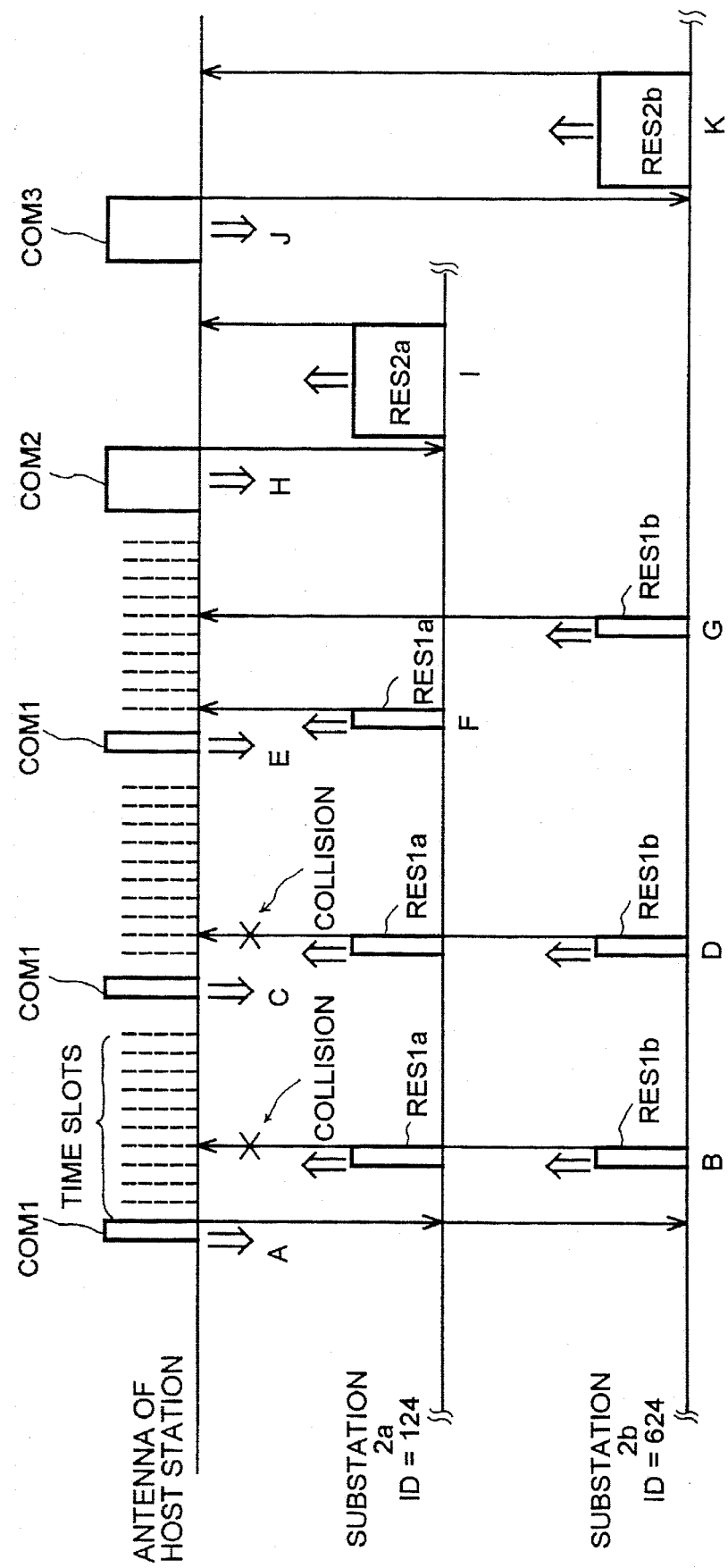
FIG. 2 is a time chart showing communication states of one embodiment of the present invention.

FIG. 1 is a block diagram showing a communication system of the present invention and FIG. 2 is a timing diagram for explaining communication states of the communication system to which the present invention is applied.

In FIG. 1, a host station 1 reads a tag owner ID and transmits/receives data between a plurality of substations (non-contact tags) 2 through radio. The host station 1 is provided, for example, at a gate of a highway to collect and record information (vehicle information, owner information, etc.) of vehicles equipped with the non-contact tags when they pass through the gate. By the way, the radio wave which the host station transmits is very weak and the host station has an area communicable with the substations near the gate.

The substation 2 is a non-contact tag or the like and stores information (tag ID, tag owner ID, etc.) which the host station 1 asks for. Now a structure of the host station 1 will be explained below.

Within the substation 2, an antenna 21 for transmitting/receiving radio waves between the host station 1 and a modulating/demodulating section 22 for demodulating received data and modulating data to be transmitted through the antenna 21 are provided. Connected to the demodulating/modulating section 22 is a serial/parallel converting section 23 which converts a serial digital signal demodulated by the demodulating/modulating section 22 into a parallel signal and converts a parallel signal output from a MPU (microprocessor) 24 into a serial signal. The MPU 24 connected to the serial/parallel converting section 23 manages information and control communications of the substation and is connected with a clock section 25, ROM 26, RAM 27 and timer section 28. The clock section 25 generates synchronization signals to digitally control each section within the substation. The ROM 26 is a non-volatile memory which stores programs for controlling communication and recording operation and ID codes. The RAM 27 is a random access memory which is used as a communication buffer, data recording and work buffers and the like. The timer section 28 generates an interruption at a specified time (for example, by transmitting a response in a designated time slot).

Next, the operation of the communication system constructed as described above will be briefly explained with reference to FIG. 2.

At first, at a point of time A in FIG. 2, the host station 1 transmits a pilot command COM1 via radio from the antenna. The pilot command COM1 is an inquiry signal containing an ID code of the host station 1. Then, each of substations 2a and 2b receive the transmitted pilot command COM1. By the way, ID codes of the substations 2a and 2b are assumed to be a decimal number and are 124 and 624, respectively, for example.

Upon receiving the pilot command COM1 at time A, each of the substations 2a and 2b selects a time slot of its own and transmits a pilot response RES1a, RES1b respectively at a point of time B based on its own ID code own. By the way, in the present embodiment, a number of the time slots is set to be 10 and the ID code of the substation 2a to be 124 (decimal number) and that of the substation 2b to be 624

(decimal number) to simplify the relationship between the number of time slots and the ID codes of the substations. When each substation selects the time slot, it determines a position of the time slot based on the digit information from the lower digit of the ID code of its own. That is, in the present embodiment, since the ID code of the substation 2a is 124, the value of the first digit, i.e., a fourth time slot is selected. Similarly, since the ID code of the substation 2b is 624, also the fourth time slot is selected. Then, each of the substations 2a and 2b transmits the pilot response RES1a, RES1b within the range of the time slot respectively selected. Due to that, a conflict occurs because the substations 2a and 2b select the same time slot and transmit the pilot responses RES1a, RES1b respectively. Incidentally, at least the ID code of the substation is contained in the pilot response RES1.

At time C, the host station 1 transmits the pilot command COM1 again and each of the substations 2a and 2b receives this pilot command COM1.

Each of the substations 2a and 2b which received the second pilot command COM1 selects a time slot for transmitting the respective pilot responses RES1a, RES1b based on their own ID codes. At this time, since both substations 2a and 2b have transmitted the respective pilot responses RES1a, RES1b already in the past, they each use the tens-place digit (the second digit) of their ID code. Accordingly, both substations 2a and 2b select the second time slot and transmit the pilot responses RES1a, RES1b respectively at time D. However, the pilot responses RES1a, RES1b transmitted from each of the substations conflict also at this time since the same time slot has been selected.

At time E, the host station 1 transmits the pilot command COM1 again and each of the substations 2a and 2b receives this pilot command COM1.

Each of the substations 2a and 2b which received the third pilot command COM1 selects a time slot for transmitting its respective pilot responses RES1a, RES1b based on its own ID code. At this time, since both substations 2a and 2b have transmitted their respective pilot responses RES1a, RES1b twice in the past, they use the hundreds-place digit (the third digit) of the ID code of their own. Accordingly, the substation 2a selects the first time slot and the substation 2b selects the sixth time slot. Then, the substations 2a and 2b transmit their respective pilot responses RES1a, RES1b to the host station 1 within the ranges of the time slots selected respectively. That is, the substation 2a transmits at time F and the substation 2b transmits at time G. Because the pilot responses RES1a, RES1b of the substations 2a and 2b do not conflict this time, the host station 1 can receive the pilot responses RES1a, RES1b from the substations 2a and 2b.

Next, at time H, in response to receiving the pilot responses RES1a, RES1b from the substations 2a and 2b, the host station 1 transmits a read command (for requesting a tag to send its own information) COM2 including the ID code of the substation 2a. Then, the substation 2a having the specified ID code receives this read command COM2.

Then, at time I, the substation 2a which received the read command COM2 transmits information of its own RES2a. The host station 1 receives it and records as the tag information of the substation 2a.

Next, at time J, in response to receiving the pilot response RES1b from the substation 2b, the host station 1 transmits a read command COM3 in which the ID code of the substation 2b is contained. Then, the substation 2b having the specified ID code receives this read command COM3.

Then, at time K, the substation 2b which received the read command COM3 transmits information of its own RES2b. The host station 1 receives it and records it as the tag information of the substation 2b (e.g., individual information of the vehicle which has the non-contact tag and passes through the gate). Then, after repeating the process of transmitting the read command and receiving information to the substation entered in the time slot, the host station 1 starts to transmit the pilot command COM1 again periodically.

As described above, when the substation receives the pilot command COM1 transmitted by the host station 1, it selects an $i_1$-th time slot based on the value of the first digit of the own ID code and transmits the pilot response RES1 when a number of time slots is "n", the ID code is represented by "m" digits in a base "n" number system (n-adic system), the notation of which is, for example, "$i_m i_{m-1} \ldots i_j \ldots i_2 i_1$", which means "$i_m \times n^{m-1} + i_{m-1} \times n^{m-2} + \ldots + i_j \times n^{j-1} + \ldots + i_2 \times n^1 + i_1 \times n^0$" (where $0 \leq i_j < n$, $1 \leq j \leq m$). Then, as far as the pilot command COM1 is transmitted, the substation repeats this operation sequentially (an $i_2$-th time slot is selected in the second time, $i_3$-th time slot in the third time, ... and $i_m$-th time slot in the m-th time). The number of times of this transmission does not exceed the finite number "m". That is to say, since the ID code of the substation is uniquely given, the conflict of the pilot responses RES1 can be avoided within at most "m" times of transmission. In this embodiment, because the ID code of the substation is uniquely given by three digits, the conflict of the pilot responses RES1 can be completely avoided by two retransmissions at most even when the pilot responses RES1 of the substations conflict. Accordingly, the probability of the conflict at this time becomes zero. In contrast, according to the method of selecting from ten time slots at (pseudo) random, the probability of the conflict is as large as 0.001 at the point of time when the re-transmission is performed twice.

Next, each operation of the host station 1 and the substation 2 of the present embodiment will be explained with reference to flowcharts shown respectively in FIGS. 3 and 4.

Figure 3:
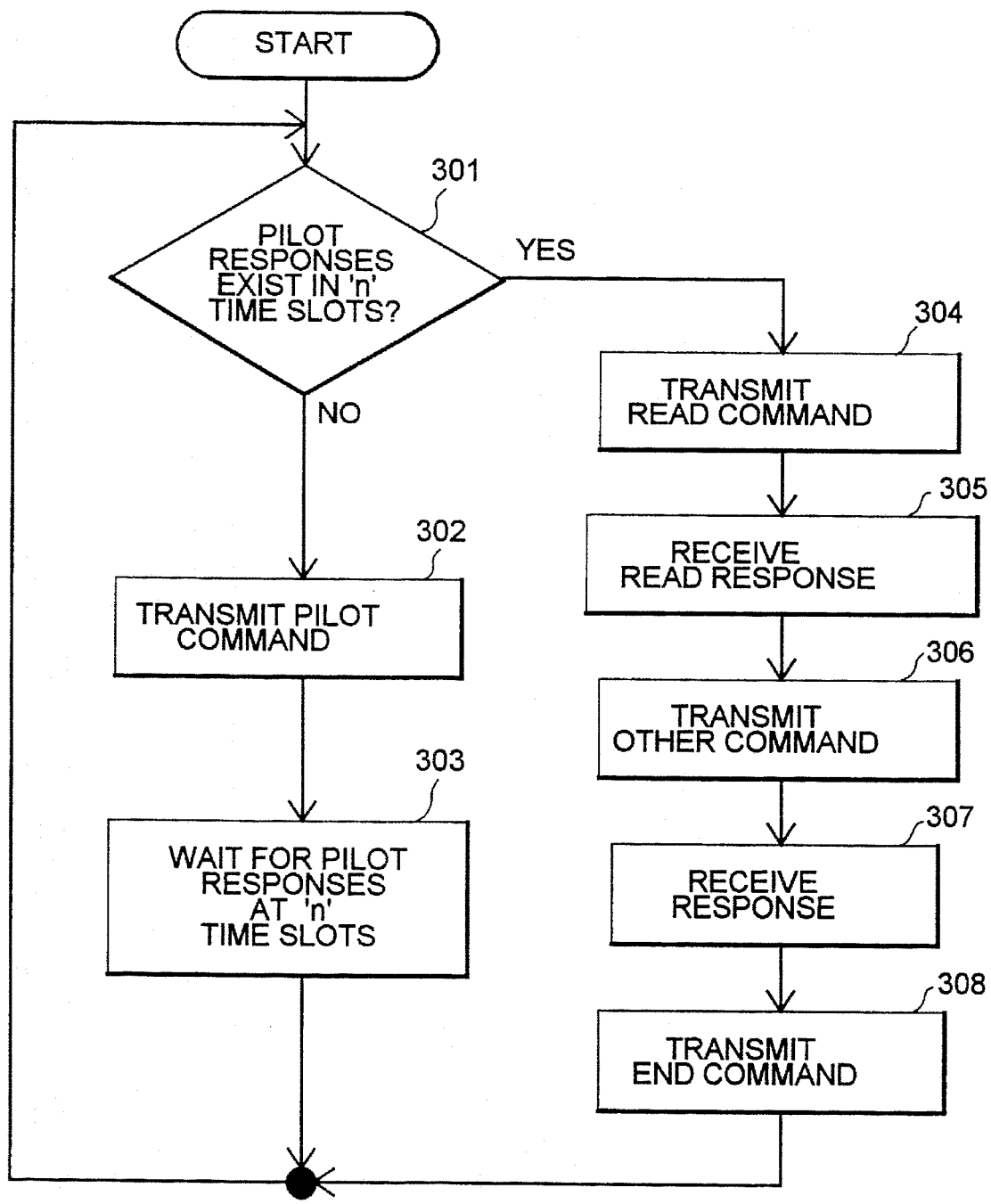
FIG. 3 is a flowchart showing processing operations of a host station shown in FIG. 1.
Figure 4:
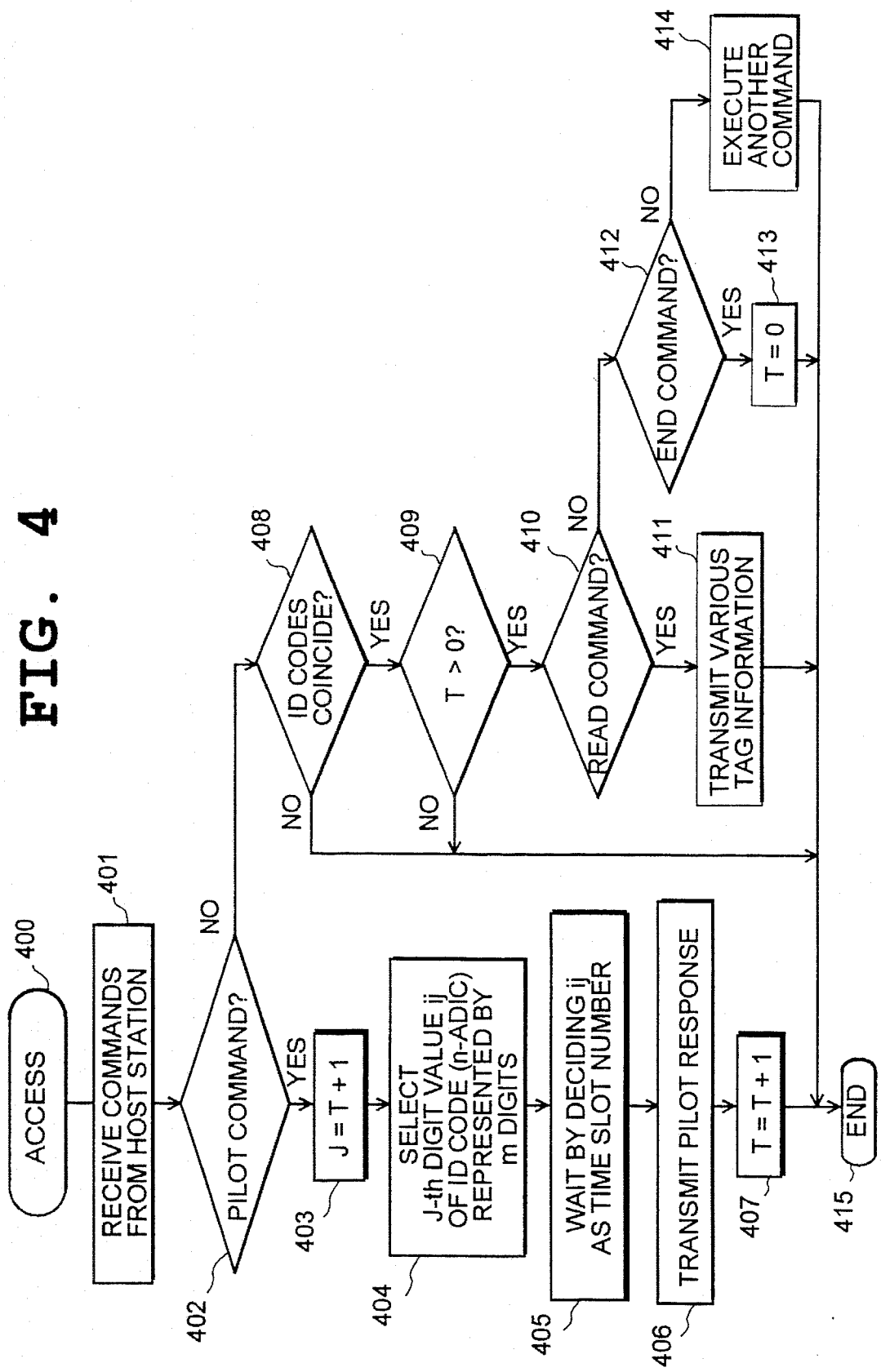
FIG. 4 is a flowchart showing processing operations of a substation shown in FIG. 1.

At first, as shown in the flowchart in FIG. 3, the host station 1 discriminates whether there have been pilot responses from substations in the time slots in Step 301. If no pilot responses are received, the host station 1 advances to Step 302 assuming that there has been a conflict of pilot responses of substations or that the communication with substations has been finished or not been carried out. Then, in Step 302, the host station 1 transmits a pilot command. After the transmission, the host station 1 waits for a response from a substation for "n" time slots. This is Step 303. Returning again to Step 301, it is determined whether there have been responses from substations for "n" time slots. That is, the processes of Step 301 through Step 303 are repeated until pilot responses from substations are received. This means that the pilot command is transmitted with a predetermined period.

When there has been a pilot response from a substation 2, the answer of Step 301 becomes Yes. Then, in Step 304, the host station t transmits a read command (for requesting a tag to send its individual information) in which a certain ID code of the responding substation is contained based on the contents of the received pilot response. In the following Step 305, the host station 1 receives a reply of the substation to the read command and executes processes such as recording of the received information. It also sends another command (Step 306) and receives a response (Step 307) as necessary and transmits an end command to the substation 2 in the end (Step 308). The communication with the substation 2 is finished when the end command is transmitted and the process returns to Step 301. If there remains a pilot response from another substation which responded at another time slot, the host station 1 repeats the processes of Step 304 through Step 308. If no other pilot response is received, the host station 1 shifts to the process in Step 302 for transmitting the pilot command. The host station 1 repeats the above-mentioned processes.

Next, the operation of the substation will be explained with reference to the flowchart shown in FIG. 4.

When the substation 2 enters a communicable area of the host station 1, it receives radio waves from the host station 1 and starts its operation in Step 400.

In Step 401, the substation receives commands such as the pilot command and read command transmitted from the host station 1.

In Step 402, it is determined whether the command received in Step 401 is a pilot command or not. If it is a pilot command, the process advances to Step 403 and if it is a command other than the pilot command, the process advances to Step 408.

In Step 403, the substation determines a certain digit for selecting a time slot for transmitting a pilot response in the following Step 404 based on its own ID code is, it is determined that which digit should be selected in the ID code based on a number of times "T" of pilot response transmissions in the past. It corresponds, for example, to the situation where the substations 2a and 2b select the third digit, i.e., the hundred-position digit, at time E in FIG. 2. Then, in Step 404, a J-th digit value $i_j$ is selected from a value "J" determined in Step 403. This corresponds to the situation where the substation 2a whose ID code is 124 selects "1" of the digit of 100 as its time slot and the substation 2b whose ID code is 624 selects "6" of the digit of 100 as its time slot. That is, the selection of the time slot is determined corresponding to the number of times of re-transmission. While the digit is shifted from a lower digit to higher digit as the number of times of re-transmission increases in the present invention, it may be shifted from a higher digit to lower digit or another method may be adopted so long as the shifting method is predetermined in the system.

In Step 405, the substation waits (delays) until the time of the time slot determined in Step 404 comes. In Step 406, the substation transmits a pilot response containing the ID code of its own as a reply to the pilot command. That is, the substation transmits the pilot response by delaying joy the time specified in Step 405.

In Step 407, the substation sets a termination of transmission of the pilot response to end the process (Step 415). By the way, a number of times (T) which the substation has transmitted the pilot response is specified by setting the termination of transmission of pilot response. That is, the value (T) specified by setting the termination of transmission of pilot response is utilized as a judgement condition for selecting a digit of the ID code to select a certain time slot corresponding to the number (figure) in the selected digit in Steps 403 and 404.

The substation receives the pilot command transmitted from the host station 1 and can transmit the pilot response at a position of the time slot determined from the ID code of its own by the process described above. Thereby, the host station 1 receives the pilot response transmitted from the substation by dividing one channel timewise into 10 subdivisions, for example, and can communicate with the substation using the ID code of the substation contained in the pilot response.

Next, a case where the command received in Step 401 is a command other than the pilot command, i.e., when the process advances to Step 408 from Step 402, will be explained.

In Step 408, it is determined whether the ID code contained in the received command coincides with the ID code of its own or not. When the ID codes coincide, the process advances to Step 409 and when they do not coincide, it is judged that the command is not addressed to the own station and the process is ended right away.

In Step 409, it is discriminated whether the termination of transmission of pilot response has been set in Step 407 or not. When the termination of transmission of pilot response has been set, the process advances to Step 410 because the value (T) is positive, and on the other hand, when the termination of transmission of pilot response has not been set, the process is ended.

In Step 410, it is determined whether the received command is a read command (for requesting the tag to send its individual information) or not. When it is the read command, the process advances to Step 411 and when it is another command other than the read command or when it is the end command, the process advances to Step 412.

In Step 411, the substation sends its individual information corresponding to the information requested by the received read command. Thereby, the host station 1 can receive and record the information from the substation.

Next, when the command received from the process in Step 410 is another command and the process advances to Step 412, it is determined whether the command is the end command or not. If it is not the end command, a process corresponding to the other received command is executed in Step 414. On the other hand, if the received command is determined to be the end command in Step 412, the termination of transmission of pilot response is reset, i.e., the value (T) is reset to zero, to end the process. By the way, the number of transmission times of the pilot response is set to zero by resetting the termination of transmission of pilot response to be able to correctly select a time slot when making a communication again with another host station.

Figure 5:
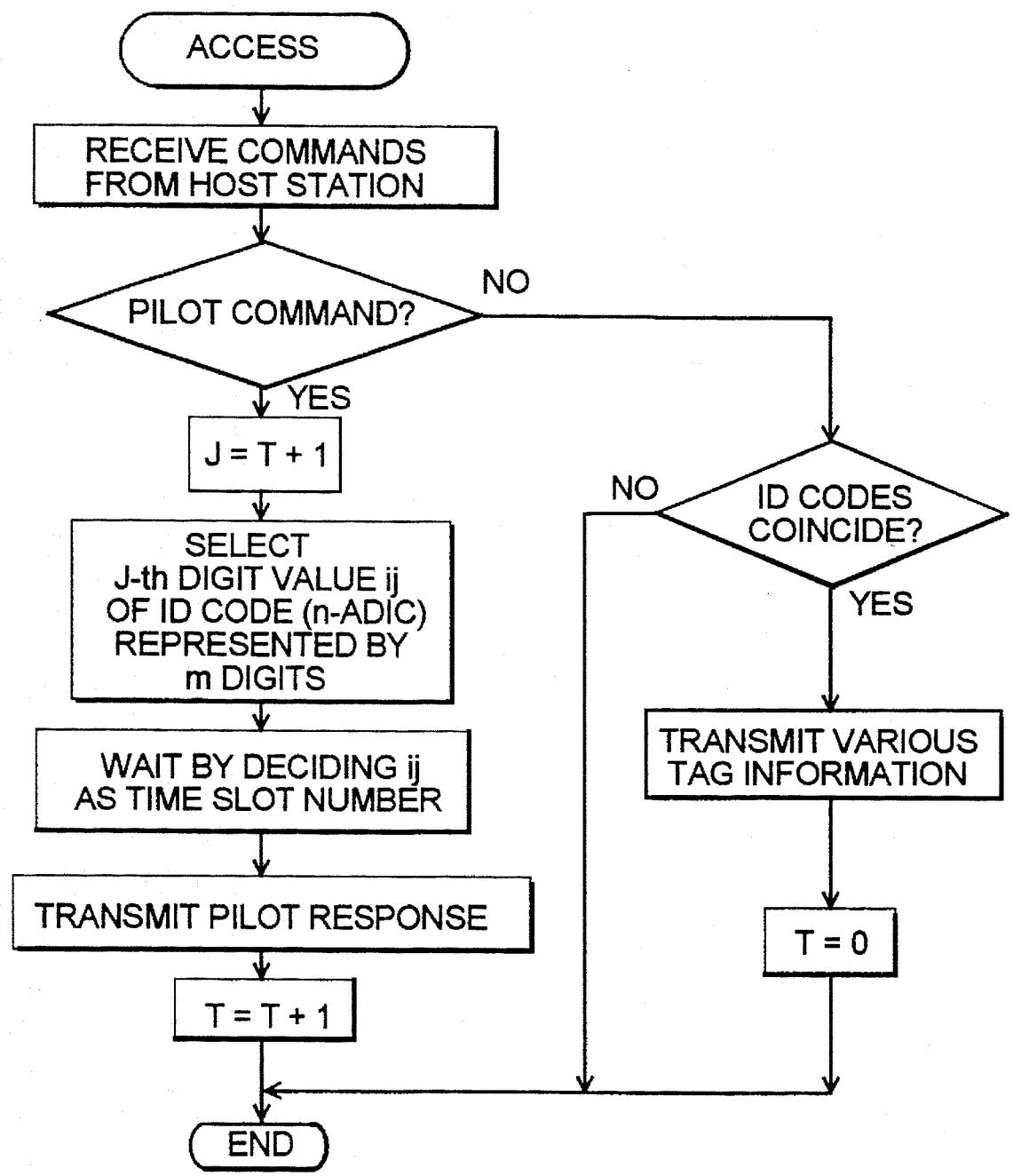
FIG. 5 is a flowchart showing processing operations of a substation according to another embodiment.

When the tag executes only transmission of tag information, the process may be simplified as shown in FIG. 5.

As described above, according to the present invention, the substation (non-contact tag) transmits a response signal corresponding to an inquiry signal from the host station after waiting for a time which corresponds to information which is based on the unique ID code of the substation, so that a communication system may be provided in which the response signals of a plurality of tags will not conflict and the probability of a communication failure due to the conflict is reduced to zero by finite times of re-transmission.

While preferred embodiments have been shown and described with reference to the foregoing preferred embodiments, variations thereto will occur to those skilled in the art within the scope of the present inventive concepts which are defined in the appended claims.

What is claimed is:

1. A communication system between a host station and one or more mobile substations which enter a geographical monitoring range of said host station within which said host station can communicate with said substations, each substation having a unique ID code, said system comprising:

inquiry signal transmitting means in said host station, for transmitting an inquiry signal having a predetermined period to a substation entering said .geographical monitoring range;

inquiry signal determining means in said substation, for determining whether a signal transmitted from said host station is said inquiry signal;

selection means in said substation, for counting a number of times said inquiry signal determining means determines a signal transmitted from said host station is said inquiry signal, and for selecting information corresponding to a digit of an ID code of said substation responsive to said number of counted times; and response signal transmitting means in said substation, for transmitting a response signal containing said ID code at a time, after said selection means selects said information, corresponding to said information selected by said selection means.

2. The communication system according to claim 1, wherein:

said host station includes information requesting signal transmitting means for transmitting an information request signal for requesting information from said substation transmitting said response signal, including said ID code of said substation when said host station receives said response signal from said substation within a predetermined time; and said substation includes ID code determining means for determining, when said substation receives said information request signal from said host station, whether said ID code contained in said information request signal coincides with said ID code of said substation, and information signal transmitting means for transmitting predetermined information responsive to said information request signal to said host station when said ID code is determined to be that of said substation by said ID code discriminating means.

3. A communication system between a host station and one or more mobile substations which enter a geographical monitoring range of said host station within which said host station can communicate with said substations, each substation having a unique ID code, said system comprising:

inquiry signal transmitting means in said host station, for transmitting an inquiry signal having a predetermined period to a substation entering said geographical monitoring range;

first response signal transmitting means in said substation, for selecting information in an ID code of said substation when said substation receives said inquiry signal transmitted by said inquiry signal transmitting means and for transmitting a first response signal containing said ID code at a time, after selecting said information, corresponding to said selected information;

information request signal transmitting means in said host station, for transmitting an information request signal for requesting information from said substation receiving said response signal including said ID code of said substation when said host station receives said first response signal transmitted by said first response signal transmitting means; and second response signal transmitting means in said substation, for determining, when said substation receives said information request signal transmitted by said information request signal transmitting means, whether said ID code contained in said information request signal coincides with said ID code of said substation and when they coincide, for transmitting a second response signal to said host station.

4. A communication system between a host station and one or more mobile units which enter a geographical monitoring range of said host station within which said host station can communicate with said tags, each mobile unit including a non-contact tag having a unique ID code, said system comprising:

inquiry signal transmitting means in said host station, for transmitting an inquiry signal having a predetermined period to a non-contact tag entering said geographical monitoring range;

inquiry signal determining means in said non-contact tag, for determining whether a signal transmitted from said host station is said inquiry signal;

selection means in said non-contact tag, for counting a number of times said inquiry signal determining means determines a signal transmitted from said host station is said inquiry signal, and for selecting information corresponding to a digit of an ID code of said tag responsive to said number of counted times; and response signal transmitting means in said non-contact tag, for selecting a time slot which is a position of time determined by dividing said predetermined period into predetermined intervals and for transmitting a response signal containing said ID code at a timing corresponding to said selected time slot.

5. A communication system between a host station and one or more substations which enter a geographical monitoring range of said host station within which said host station can communicate with said substations, each substation having a unique ID code, said system comprising:

inquiry signal transmitting means in said host station, for transmitting an inquiry signal having a predetermined period to a substation entering said geographical monitoring range;

first response signal transmitting means in said substation, for selecting information corresponding to a digit of an ID code of said substation, when said substation receives said inquiry signal transmitted by said inquiry signal transmitting means, and for transmitting a first response signal containing said ID code at a time, after selecting said information, corresponding to said selected information;

information request signal transmitting means in said host station, for transmitting an information request signal for requesting information from substation transmitting said response signal, including said ID code of said substation, when said host station receives said first response signal transmitted by said first response signal transmitting means; and second response signal transmitting means in said substation, for transmitting a second response signal to said host station when said ID code contained in said information request signal coincides with said ID code of said substation.

6. A communication system between a host station and one or more mobile units which enter a geographical monitoring range of said host station within which said host station can communicate with said tags, each mobile unit including a non-contact tag having a unique ID code, said system comprising:

inquiry signal transmitting means in said host station, for transmitting an inquiry signal having a predetermined period to a non-contact tag entering said geographical monitoring range;

selection means in said non-contact tag, for selecting a time slot in a response period based on information corresponding to a digit of an ID code of said tag, said digit corresponding to a number of times said tag has received said inquiry signal transmitted by said inquiry signal transmitting means;

response signal transmitting means in said non-contact tag, for transmitting a response signal containing said ID code at a timing corresponding to said time slot selected by said selection means;

information request signal transmitting means in said host station, for transmitting an information request signal for requesting information from the non-contact tag, including an ID code of said tag, when said host station receives said response signal containing said ID code transmitted by said response signal transmitting means; and information request response signal transmitting means in said non-contact tag, for transmitting an information request response signal to said host station when said non-contact tag receives said information request signal transmitted by said information request signal transmitting means and when said ID code contained in said information request signal coincides with said ID code of said non-contact tag.

7. A method of communicating between a host station and a substation, said method comprising the steps of:

transmitting an inquiry signal from said host station;

receiving said inquiry signal at said substation;

generating information based on a unique indicia assigned to said substation, responsive to a number of times said substation has received said inquiry signal; and transmitting, after said generating step, a reply signal from said substation to said host station after a time period corresponding to said generated information has elapsed, wherein said receiving step includes the step of incrementing a counter when said substation receives said inquiry signal; and said generating step includes the step of selecting information at a position in said unique indicia corresponding to contents of said counter.

8. The method of claim 7, wherein said unique indicia is a multi-digit number; and said selecting step includes the step of choosing a digit in said multi-digit number.

9. The method of claim 8, wherein said multi-digit number is a base-ten number.

10. A method of communicating between a host station and a substation, said method comprising the steps of:

transmitting an inquiry signal from said host station;

receiving said inquiry signal at said substation:

generating information based on a unique indicia assigned to said substation, responsive to a number of times said substation has received said inquiry signal;

transmitting, after said generating step, a reply signal from said substation to said host station after a time period corresponding to said generated information has elapsed;

receiving said reply signal at said host station; and transmitting an information request signal from said host station to said substation, said information request signal including a field containing information representative of said unique indicia.

11. The method of claim 10, further comprising the steps of:

receiving said information request signal at said substation;

comparing said information in said field to said substation's unique indicia; and transmitting a second response signal from said substation to said host station when said information in said field corresponds to said substation's unique indicia.

12. A method of transmitting information from a plurality of substations, said method comprising the steps of:

receiving an inquiry signal at each of said substations;

generating, in each of said substations, information based on a unique indicia assigned to said substation, responsive to a number of times said substation has received said inquiry signal; and transmitting, after said generating step, a reply signal from said substation to said host station after a time period corresponding to said generated information has elapsed, wherein said receiving step includes the step of incrementing a counter when said substation receives said inquiry signal; and said generating step includes the step of selecting information at a position in said unique indicia corresponding to contents of said counter.

13. The method of claim 12, wherein said unique indicia is a multi-digit number; and said selecting step includes the step of choosing a digit in said multi-digit number.

14. The method of claim 13, wherein said multi-digit number is a base-ten number.

15. A method of transmitting information from a plurality of substations, said method comprising the steps of:

receiving an inquiry signal at each of said substations;

generating, in each of said substations, information based on a unique indicia assigned to said substation, responsive to a number of times said substation has received said inquiry signal;

transmitting, after said generating step, a reply signal from said substation to said host station after a time period corresponding to said generated information has elapsed;

receiving an information request signal responsive to said response signal at said substation;

comparing information in a predetermined field in said information request signal to said substation's unique indicia; and transmitting a second response signal from said substation when said information in said field corresponds to said substation's unique indicia.

16. A substation communication system in a substation for communicating with a base station, said system comprising:

receiving means for receiving communication signals;

generating means responsive to receipt of an inquiry signal by said receiving means, for generating information based on a unique indicia assigned to said substation, responsive to a number of times said substation has received said inquiry signal;

determining means for determining when a time period corresponding to said generated information has elapsed after operation of said generating means; and transmitting means, responsive to said determining means, for transmitting a response signal when said time period has elapsed, wherein said receiving means includes a counter counting a number of times said substation receives said inquiry signal; and said generating means includes means for selecting information at a position in said unique indicia corresponding to contents of said counter.

17. A substation communication system in a substation for communicating with a base station, said system comprising:

receiving means for receiving communication signals;

generating means, responsive to receipt of an inquiry signal by said receiving means, for generating information based on a unique indicia assigned to said substation, responsive to a number of times said substation has received said inquiry signal;

determining means for determining when a time period corresponding to said generated information has elapsed after operation of said generating means;

transmitting means, responsive to said determining means, for transmitting a response signal when said time period has elapsed;

comparing means for comparing information in a predetermined field in an information request signal received by said receiving means to said substation's unique indicia; wherein said transmitting means is further for transmitting a second response signal when said information in said field corresponds to said substation's unique indicia.

* * * * *